US 8,098,577 B2

(12) United States Patent
De Vos et al.

(10) Patent No.: US 8,098,577 B2
(45) Date of Patent: Jan. 17, 2012

(54) METHOD AND DEVICE FOR MANAGING SIMULTANEOUS CONNECTIONS OF A MOBILE TELECOMMUNICATIONS DEVICE TO DIFFERENT NETWORKS

(75) Inventors: Chris De Vos, Wemmel (BE); Axel Schollaert, Kortenberg (BE); Lambert Achien, Lummen (BE); Jan Vercruysse, Blanden (BE)

(73) Assignee: Option, Leuven (BE)

( * ) Notice: Subject to any disclaimer, the term of this patent is extended or adjusted under 35 U.S.C. 154(b) by 1236 days.

(21) Appl. No.: 11/143,937

(22) Filed: Jun. 3, 2005

(65) Prior Publication Data
US 2006/0013176 A1    Jan. 19, 2006

(30) Foreign Application Priority Data
Jun. 3, 2004    (EP) ..................... 04447135

(51) Int. Cl.
*G01R 31/08*    (2006.01)
(52) U.S. Cl. ...................... 370/230; 370/345
(58) Field of Classification Search ............... 455/414.1, 455/127.3, 450; 370/316, 337, 338, 352, 370/470, 230, 345
See application file for complete search history.

(56) References Cited

U.S. PATENT DOCUMENTS

| | | | | |
|---|---|---|---|---|
| 5,588,020 A | * | 12/1996 | Schilling | 370/337 |
| 6,064,678 A | * | 5/2000 | Sindhushayana et al. | 370/470 |
| 6,112,088 A | * | 8/2000 | Haartsen | 455/437 |
| 6,208,625 B1 | * | 3/2001 | Zancho et al. | 370/316 |
| 7,647,053 B2 | * | 1/2010 | Pitchers | 455/450 |
| 2002/0061013 A1 | * | 5/2002 | Yoshida et al. | 370/352 |
| 2004/0002330 A1 | | 1/2004 | Chitrapu | |
| 2004/0047323 A1 | * | 3/2004 | Park et al. | 370/338 |
| 2005/0014477 A1 | * | 1/2005 | Ballantyne | 455/127.3 |
| 2005/0032507 A1 | * | 2/2005 | Na et al. | 455/414.1 |
| 2005/0064891 A1 | * | 3/2005 | Chaudry et al. | 455/527 |

FOREIGN PATENT DOCUMENTS

| | | |
|---|---|---|
| EP | 1119137 A | 7/2001 |
| EP | 1191806 A2 | 9/2001 |
| EP | 1395076 A | 3/2004 |
| WO | WO 9929126 A1 * | 6/1999 |

* cited by examiner

*Primary Examiner* — Derrick Ferris
*Assistant Examiner* — Gbemileke Onamuti
(74) *Attorney, Agent, or Firm* — Browdy and Neimark, PLLC

(57) ABSTRACT

Method and device for managing simultaneous connections of a mobile telecommunications device to at least a wireless local area network and a mobile telephone network via a single terminal of the mobile telecommunications device, the method including the steps of: (a) establishing a first wireless connection of the terminal with the wireless local area network, (b) establishing a second wireless connection of the terminal with the mobile telephone network, (c) responding to each network at predetermined times, such that the first and second wireless connections are maintained, and (d) preventing simultaneous transmittals of data from the terminal to both networks over the first and second wireless connections.

18 Claims, 4 Drawing Sheets

METHOD AND DEVICE FOR MANAGING SIMULTANEOUS CONNECTIONS OF A MOBILE TELECOMMUNICATIONS DEVICE TO DIFFERENT NETWORKS

The present invention relates to a method for managing simultaneous connections of a mobile telecommunications device to at least a wireless local area network and a mobile telephone network via a single terminal of the mobile telecommunications device. The invention further relates to a mobile telecommunications device comprising a single terminal equipped for supporting a first connection to a mobile telephone network and a second connection to a wireless local area network.

Nowadays, a user has a choice of different wireless telecommunication networks which he can access with a suitable mobile telecommunication device. Examples are mobile telephone networks (e.g. GSM/GPRS/WCDMA or other) as well as wireless local area networks (WLAN). The problem with these networks is that each has its own standard with strict rules of timing and that they are not synchronized with each other on the physical layer. As a result, wireless telecommunication devices need to be equipped with a separate terminal for each wireless telecommunication network.

There is thus a need for a method for managing simultaneous connections of a mobile telecommunications device to at least a wireless local area network and a mobile telephone network via a single terminal of the mobile telecommunications device. It is an aim of the invention to provide such a method. It is furthermore an aim of the invention to provide a device on which the method can be implemented.

The aim is achieved according to the invention with a method comprising the following steps:
a) establishing a first wireless connection of the terminal with the wireless local area network,
b) establishing a second wireless connection of the terminal with the mobile telephone network,
c) responding to each network at predetermined times, such that the first and second wireless connections are maintained,
d) preventing simultaneous transmittals of data from the terminal to both networks over the first and second wireless connections.

An analysis of the problem set out above has shown that in order to avoid that the connection to one of the networks becomes lost, the network has to receive a response from the terminal within a given time interval. According to the invention, such responses are issued at predetermined times, chosen such that the connections to both the mobile telephone network and the wireless local area network are maintained. In other words, both connections are kept hot or active.

The prior art analysis has further shown that for several reasons it is undesirable or it may even be unallowable to transmit from the same terminal to both networks simultaneously. Therefore, according to the invention measures are taken to avoid such simultaneous transmittals.

As a result of these steps, the terminal can simultaneously support communication with both networks, so that the use of separate terminals for each network can be avoided. This can result in a reduction in hardware cost for the manufacturer of the mobile telecommunications device and the end user.

As used herein, the term WLAN is meant to encompass at least systems operating in accordance with standards such as IEEE 802.11a-g or other. The term should be construed to encompass also any other shorter-range wireless communication technology, particularly, but not limited to, those that do not require a license for operation by the Federal Communications Commission (FCC) in the United States (U.S.) and other similar unlicensed bands outside of the U.S., which are generally at 2.4 GHz and 5 GHz.

As used herein, the term mobile telephone network is meant to encompass at least systems operating in accordance with standards such as GSM, GPRS, WCDMA, UMTS or any other mobile telephone network, generally operating at around 900 MHz or at around 1800-1900-2100 MHz but not limited thereto.

The method according to the invention preferably further comprises the steps of defining a hierarchy between different types of data to be transmitted over the first and second wireless connections. On the basis of this hierarchy, the transmittal one type of data is delayed in favour of the transmittal of another type of data. This can help to avoid loss of the connection to one of the networks, in particular the mobile telephone network if the data is a telephone call. Advantageously, voice data is placed high on the hierarchy, so that voice data is transmitted substantially immediately, whereas text data, such as for example a Short Message Service (SMS) message or an e-mail, is placed low on the hierarchy, so that the transmittal can be delayed in favour of voice data.

The method of the invention is preferably implemented in the "physical and data link layer" of the terminal, also split into the MAC and LLC layer in WLAN. This is also called tight coupling, as opposed to loose coupling. The advantage is that a similar set-up is achieved as in 3GPP-standardised technologies where measurements are performed and handovers are managed as close as possible to the radio events. It results in a controllable Quality of Service and maximised throughput of the WLAN connection in an equation with both connections. In other words, the throughput of the WLAN connection can be maximised starting from a mathematical equation with the WLAN connection and the GSM/GPRS/WCDMA connection as inputs.

The method of the invention preferably further comprises the step of handing over a data communication from the first connection to the second connection or vice versa if necessary, e.g. if the signal on one of the connections becomes too weak. In this way, loss of ongoing data communication can be avoided. Furthermore, connection parameters of the first and second connections can be monitored on the terminal to determine which of the connections is more suitable at each time. A handover of a data communication can then occur when the connection parameters of one of the connections no longer meet predetermined values (cost of the link at hand, SN ratio, QoS, etc.).

The method of the invention can further comprise the step of, upon receipt of data from the mobile phone network via the second connection, transmitting a buffer request to the access point of the wireless local area network via the first connection. This buffer request is a request to buffer data to be transmitted to the terminal via the wireless local area network on the access point. These steps are advantageous if the terminal is equipped with only a single receiver for both networks: if the receiver is occupied by the mobile telephone network, the access point of the wireless local area network buffers data to be transmitted to the terminal instead of transmitting it. If the access point would start transmitting the data, the terminal would not be able to capture it and consequently the data would be lost and have to be retransmitted later on. The use of a single receiver on the terminal is advantageous in view of a reduction of power consumption. Otherwise, the terminal can also be equipped with a receiver for each network, enabling it to simultaneously capture data from the mobile telephone network and the wireless local area network.

The mobile telecommunications device of the invention comprises a single terminal equipped for supporting the first connection to the mobile telephone network and the second connection to the wireless local area network. The terminal comprises a processing means for simultaneously managing the first and second connections. This processing means is adapted for responding to each network at predetermined times, such that the first and second wireless connections are maintained, and for preventing simultaneous transmittals of data from the terminal to both networks over the first and second wireless connections. In other words, the method of the invention can be implemented on this processing means.

The terminal of the mobile telecommunications device of the invention can comprise separate receivers and transmitters for each connection. However, since simultaneous transmittal to both networks is avoided, it is more economic to combine the transmitters into one. Having separate receivers for each network is advantageous from a viewpoint of capturing as much data as possible. Combining the receivers into one is also possible, which is advantageous from a viewpoint of reducing power consumption.

Transmission towards the mobile telephone network is usually not disturbing for the receipt of signals via the wireless local area network. However, the reverse may constitute a problem. Therefore, the terminal is preferably provided with a front-end filter for attenuating frequencies in the frequency band of the mobile telephone network during transmission towards the wireless local area network.

The mobile telecommunications device can be a PCMCIA card or PC card, a cellular phone, a personal digital assistant, or any other mobile telecommunications device known to the person skilled in the art.

The invention will be further elucidated by means of the following description and the appended figures.

Figure 4:
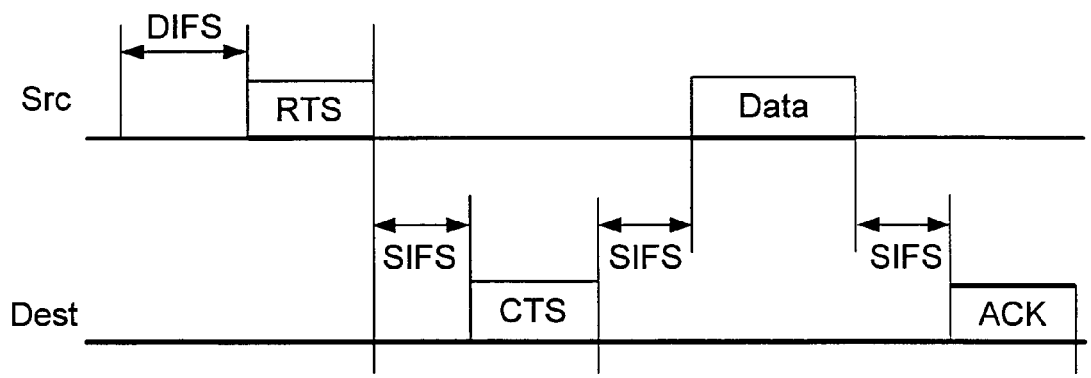

FIG. 4 gives the formula how to select both the length of the MPDU data frame and the WLAN speed (rate) in order to maximise the WLAN throughput in a given active GPRS/UMTS environment.

Figure 5:
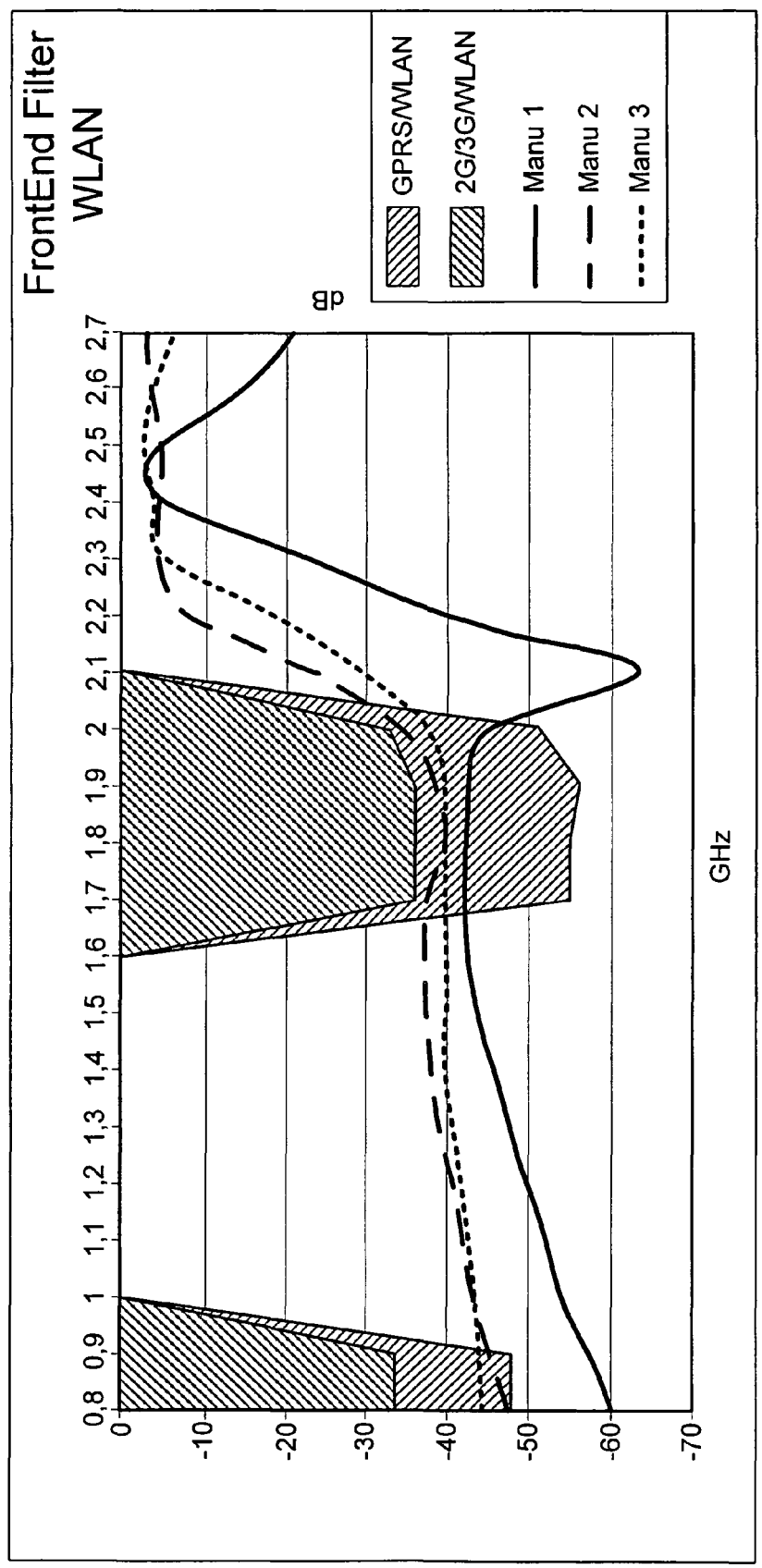

FIG. 5 shows the requirements of the extra Rx front-end filter.

The wireless networks GSM/GPRS/WCDMA and WLAN both have strict rules of timing and are not synchronized with each other on the physical layer. So when designing a mobile telecommunications device with a single terminal suitable for both, one is faced with numerous problems. One problem is that for several reasons it is undesirable or even not allowed to have both transmitters working simultaneously. This becomes even worse as the WLAN-2G.3G-co-MM task should respect some silent period after the transmission, because the battery capacitors on the mobile telecommunications device have to recover from the depletion caused by such bursty transmission. On the other hand, receiving data via one of the networks, while the other constituent part of the terminal is transmitting is causing no difficulties whatsoever in terms of good performance. According to the invention, the terminal is managed such that the corresponding operations inside the terminal are made isochronous, or in other words that both networks are synchronised at terminal side. Transmission bursts from the different access technologies are prevented to occur simultaneously. In an embodiment where the terminal has two transmitters, one for each network, the source of worry is to prohibit that the two transmitters are working simultaneously.

From a customer perspective it is advantageous to have WLAN and GPRS/UMTS working simultaneously, with the restriction of having both transmitters working simultaneously. Hence, the goal is that for example while WLAN is in operation:

the terminal may support a PS PDP context and PS attach;
the terminal supports appropriate UMTS, GPRS and GSM location updates to maintain the connection;
the terminal supports sending and receiving of SMS;
it should be possible to do a GSM voice call at the same time.

It would also be possible to divert SMS messages to a WLAN network but for SMS to be dispatched it is the only way for a long time to come. WLAN networks are currently not tuned up for SMS messaging, however this may be so in the future.

The method of the invention enables concurrent operation of UMTS/GPRS/WLAN, by which is meant the ability to simultaneously monitor all networks so that a Roaming Management client can make the best choice out of all available access technologies for the next upcoming traffic according to a set of rules. The monitoring involves the measurement of connection parameters for each access technology and comparing them with predetermined threshold values. It is generally required that the UMTS/GPRS air-interface must be protected from interference by the WLAN, but on the other hand some loss of traffic on the WLAN air-interface is acceptable because of the general resilience of the WLAN protocol. Thus, for example simultaneous operation of the transmitters is prevented, but preference is given to the UMTS/GPRS transmitter because of the higher sensitivity of the connection.

The Roaming Management client can have a function for interface selection, which dynamically always uses the most suitable interface to communicate over. This can be based on available bandwidth, which normally is a static property of each interface. However, in some cases, especially WLAN networks, the efficient throughput of an interface is degrading with the signal strength over the air interface. So, the signal strength can be monitored in order to have a suitable handover from a degraded 802.11 network to another available network, most often a Radio WAN network such as GPRS, CDMA2000 or UMTS network.

The enhanced handover framework can include performance assistance. Performance consists of monitoring the signal-strength at layer 1 (or layer 2) for a WLAN adapter. The client can also include other metrics also at higher protocol layers, thus exploiting IP and TCP statistics.

The Roaming Client can monitor the WLAN signal strength using two thresholds—one for initiating auto-dial on GPRS and a second to actually move over to the already established GPRS link. The reason for this feature is that WLAN cards are very slow in giving a link down (unavailable) signal while providing nil throughput due to low signal strength. This means that the Client also preferably has thresholds for when to leave and tear down either GPRS or UMTS due to low signal strength (throughput).

By being able to transmit on a new interface, the Client can send and receive MIP and DHCP solicitations/advertisements to find a local Foreign Agent or Care-of-address at the same time as still receiving application data on the other interface. The handoff delay can be further reduced to merely the time it takes for the Home Agent to send a MIP registration reply on the new link.

When the Roaming Client is switched on the terminal manager of the client and the different options like "Roaming Policy Setting" manage all NIC cards like WLAN, GPRS and UMTS. This option guarantees the behaviour of the Roaming Client in the way that the user has defined it.

The method of the invention makes it possible to require only one transmitter at the time, either for accessing the GPRS/WCDMA air interface or the WLAN medium. Moreover this method makes it possible to redesign the complete wireless RF front-end receiver in such a way that the performance of the RF radio transmission and receipt does substantially not deteriorate, so that the terminal meets all current requirements (sensitivity, out-of-band blocking, etc.) for WLAN, GPRS and WCDMA in question.

Below, it is described which conducts are required by WLAN and GSM/GPRS/WCDMA in order to keep the connections "hot".

In WLAN, the terminal is in a Powersave state as long as there is no traffic. At given times, the Powersave state is cleared in order to listen for an AP DTIM event. If a DTIM beacon is received with contents that indicate queued traffic or pending broadcasts for the client, the terminal exits Powersave mode and receives the traffic. Otherwise, the terminal powers back down to the Powersave state and repeats this cycle for every DTIM period. It is important to receive the DTIM beacon because the 802.11 standard specifies that when stations are associated to an AP and any of them are sleeping, the AP must buffer all broadcast traffic and delay transmitting that traffic until immediately after the DTIM beacon.

In GSM/GPRS, there are the RAU (route area updates) and LU (location updates), which are requested by the lowest layers in the terminal. The LU/RAU update does not happen very often (maybe every 30 mins or every few hours depending on the operator's network) and the terminal triggers it. See for Mobility Management specifications in 3GPP TS 04.08 and 3GPP TS 03.60.

The terminal always initiates location updates, so that they are controlled by the terminal. Location updates only happen in state MM_IDLE under the following conditions:
  whenever the terminal notices that the LAI in the current BCCH has changed (as a result of the terminal moving);
  when timer T3211 expires (fixed at 15 s, handles some protocol error conditions);
  when timer T3213 expires (fixed at 4 s, handles some other protocol problems);
  when timer T3212 expires (set in System Info 3 message on the BCCH, range 6 minutes to 25.5 hours, it is usually set to around an hour).

Apart from the LU/RAU updates, there is GSM/GPRS paging. The terminal monitors the GSM slots while in idle state in order to get possible paging messages or to make required RF level measurements. Paging involves the following terminal operations:
  The terminal is in DRX (discontinuous reception) mode and so it monitors only the paging blocks (one paging block comprises 4 successive TN0 slots in a multi-frame) assigned to the paging group it belongs to. While the DRX mode is specified by the 3GPP standards as optional, it became a by default mode of operation of modern terminals for power savings and increase of battery life.
  In order to further increase the power savings the terminal monitors its assigned paging blocks only in one multi-frame from a group of BS_PA_MFRMS successive multi-frames, which is allowed by the standards. The BS_PA_MFRMS value is between 1 and 5 (recommended value: 4).
  The paging channels could be organized on 1 to 4 slots on the same TDMA frame and this is signalled by the network through the value of the BS_CC_CHANS parameter. Also, on the same multi-frame the paging channels could be combined or not (BS_CCCH_SDCCH_COM parameter being TRUE or FALSE) with SDCCH channels. The values of these parameters specify the position of the paging blocks in a multi-frame and do not influence the rate of appearance of the paging blocks.
  While in idle mode the terminal is required to measure the RF level of the BCCH carrier of its own cell and of 6 to 32 other BCCH carriers of the neighbouring cells (the specific number of carriers and their frequencies are broadcasted by the network; usually it is seldom greater than 6 due to network topology: it is very unlikely for a cell to have more than 6 neighbours in real implementations). There is no synchronisation of transmissions of base stations.
  The terminal decodes its own cell identity (BSIC) and the BSICs of the neighbouring cells (those in the above mentioned measuring list) at least every 30 seconds (127 multi-frames, approximately). This means the terminal has to monitor and decode the information contained in a special slot of the multi-frame (SCH). This situation appears quite rarely as compared to the other ones and it has little impact on the total collision rate between WLAN and GSM/GPRS.
  Finally, the terminal reports (it is transmitting) in 1 slot of a multi-frame the measurements it did.

The above shows that paging happens more frequently than LU/RAU updates. Therefore it is given a higher importance in the method of the invention. If the terminal misses or looses this 1 timeslot due to errors, the terminal is temporarily lost and needs to regain the network by spending 10 seconds. It is remarked that it is a known situation in Idle Mode in (GPRS) Radio Resource when no packet or circuit-switched connection is in progress. When the terminal is performing a voice call the network conscientiously takes care of the terminal by providing whatever it takes to keep the call established. Another frequency channel might be made available.

With WCDMA there are two basic service states defined for the UE in respect of the operation of RRC. These are idle mode and connected mode. In idle mode, the terminal has no existing RRC connection in place. The terminal has found and registered on the system, it is monitoring the downlink system information and paging information, taking neighbour cell measurements for cell reselection, and performing LU/RAU updates as required. In connected mode, the terminal has established an RRC connection. However, this does not necessarily imply the coexistence of a dedicated radio resource. As a result, connected mode has four sub-states which describe the resources allocated and used by a terminal when in connected mode: CELL_DCH, CELL_FACH, CELL_PCH and URA_PCH:
  In the CELL_DCH state, the terminal has been allocated a dedicated physical resource—so not sharing its resources with other terminal. It has been allocated transport capability for signalling and may also have transport for traffic. The terminal does not perform location updates but, if registered on the PS domain of the Core Network (CN), it will be performing routing area updates. It's only in this state that the PA is considered to be continuously on.

In the other states of connected mode, the terminal has no dedicated physical resource. Transport for information is provided via the Random Access Channel (RACH) FACH. The RACH is in the uplink direction. Further the terminal may still be monitoring the downlink system information by the Common Packet Channel (CPCH) and the Paging Channel (PCH). The RACH Message Part is usually a 10 ms message frame which is split into 15 slots each of 2560 chips, with each slot comprising two parts, in a format similar to the uplink DPCH, i.e. a data part in the I channel and control information in the Q channel. The data part carries the RACH transport channel, while the control part carries layer 1 signalling containing pilot bits and a TFCI. Where a 20 ms message is used, this simply comprises two consecutive 10 ms parts. The RACH transport channel is mapped onto the PRACH physical channel and is used for signalling messages concerned with location updates, call initiation or registration with the network at switch-on. The PRACH is used for data with low data rates of operation determined by prior arrangement with the network. There are 15 access slots every 20 ms, i.e. over two frames, and they are spaced 5120 chips apart. The availability of these slots is indicated by higher layers. The RACH transmission begins with either one or several preambles. Therefore the PRACH signalling is quite bursty too as a GSM/GPRS TDMA system whenever observed from the terminal.

The terminal transmission WCDMA power is controlled into 2 loop processes: Outer Loop and Inner Loop power control. Outer Loop power control sets the signal-to-interference ratio ($SIR_{target}$). This is carried out via Radio Resource Control layer 3 measurement reports sent from the terminal to the Serving Radio Network Controller (SRNC). The $SIR_{target}$ value supplied by the higher-layer signalling is dynamic and the updating process is referred to as outer loop power control. The inner loop power control in the physical layer (adjustment is done with Transmit Power Control commands) adjusts the peer entity transmit power so that the measured SIR fulfils the $SIR_{target}$ requirement. The receiving entity (terminal physical layer or Node B physical layer) measures the SIR and compares it to the $SIR_{target}$ and sends subsequently the DL TPC bits once in every timeslot to the peer. There is no neutral command; it is either increase or decrease.

When using a dedicated physical channel, the terminal will be receiving TPC bits in each downlink timeslot. Depending on the rate of the physical channel there may be between 2 and 8 bits in each slot, but in any case there are only coded to indicate 1 of 2 possible values. Either an uplink power step up or a power step down is indicated. The power step size (in dB) is variable and the step to be used, referred to as $\Delta_{TPC}$, is indicated to the terminal in higher-layer signalling. For the purpose of the closed loop power control it may be either 1 dB or 2 dB. For each DL slot the terminal will interpret the TPC bit to produce the TPC command, referred to as TPC_cmd. The TPC_cmd may have 1 of 3 values, −1, 0, +1. Thus the power step to be applied on a DPCH channel in each slot is computed as:

$$\Delta_{DPCH} = \Delta_{TPC} * TPC\_cmd$$

Inner loop is performed entirely in the physical layer; therefore it makes the adjustments of power control very fast. All information carried in the uplink (UL) and in the downlink (DL) directions is formatted into a 10 ms frame structure. The 10 ms frame is then subdivided into 15 timeslots, each of duration 666.7 μs. Each of these timeslots corresponds to a power control period. Hence there are 1500 power control periods per second.

When the method of the invention is implemented on a PCMCIA card, of course also the specifications of the PCMCIA standard have to be taken into account, which confines the power consumption of the terminal. The maximum Peak Current provided by the host PC is 1 A at 3.3 Volt. The host will support an Average Current of about 750 mA (at 3.3 Volt). The typical host platform provides for a three watt PC Card solution without consideration for one or two slots. Usually, this is a power (thermal) limit. A host platform is typically designed to manage three watts of thermal energy produced within the host interior PC Card physical area. Current is not usually limited in the host platform design by circuitry other than that found in the VCC/VPP switch, and a card may require and dissipate power in excess of three watts at the expense of thermal degradation or failure. Responsible card design however dictates that the total power dissipation requirement of any single PC Card is preferably less than the three-watt standard implementation.

The above shows the problems faced when designing a telecommunications device with a single terminal which simultaneously supports GSM/GPRS/WCDMA and WLAN. Below, some embodiments are described in which these problems are solved. Some solutions to specific problems, for example how to maintain the connections "hot", have already been described above. The description below is limited to the embodiment where the telecommunications device is a PCMCIA card, but it is clear that similar methods can be developed for any other telecommunications device known to the person skilled in the art.

One solution according to the invention is to make WLAN the master and GSM/GPRS/WCDMA the slave. As noted before all WLAN-2G.3G-co-MM issues have to be dealt with on the host. Two of the components out of this WLAN-2G.3G-co-MM tasks are the following:

If the terminal wants to send off an SMS message, this transmission is delayed until a new DTIM period starts. The networks sends off an SMS and expects acknowledge from the terminal. This acknowledgement (±20 msec.) should be presented in the first available DTIM period. If the network does not receive such acknowledgement within a firm period after the SMS message, the network will retry until successful, as SMS is a store-and-forward mechanism.

Since the terminal knows it is going to do the LU/RAU update well in advance, the terminal avoids a conflict between the WLAN system and the update. Therefore the terminal does an LU/RAU update when convenient just to keep the timer(s) refreshed and avoid the conflict situation arising.

As an alternative, WLAN can be the slave and GSM/GPRS/WCDMA the master. The concept here is to reverse and to make of the WLAN part in most circumstances the slave and the GPRS/WCDMA part the master for the simple reason that the GSM/GPRS/UMTS have very strict timings. Take for instance the paging requirements. Further a WLAN service combined with a TCP/IP network is quite resilient against dropouts of communication. This embodiment basically involves decreasing the throughput speed of the WLAN data stream but fully controlling the MAC Tx (transmission) buffer and synchronising it with the Tx GPRS/UMTS data stream. A bus-interface between our WLAN baseband processing unit and the GSM/GPRS/WCDMA BB is not needed, but some GPIO signals. By using two GPIOs, one could be used for the WLAN's "request service permission from GPRS/UMTS" state and the second for the GPRS/UMTS "grant service permission to the WLAN" state.

Figure 1:
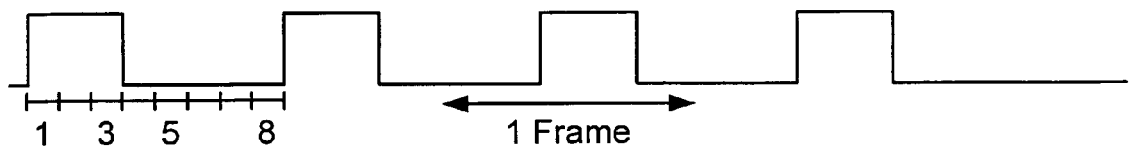
FIGS. 1 and 2 show how in one embodiment of the invention time slots of a GPRS signal are granted to WLAN for service.
Figure 2:
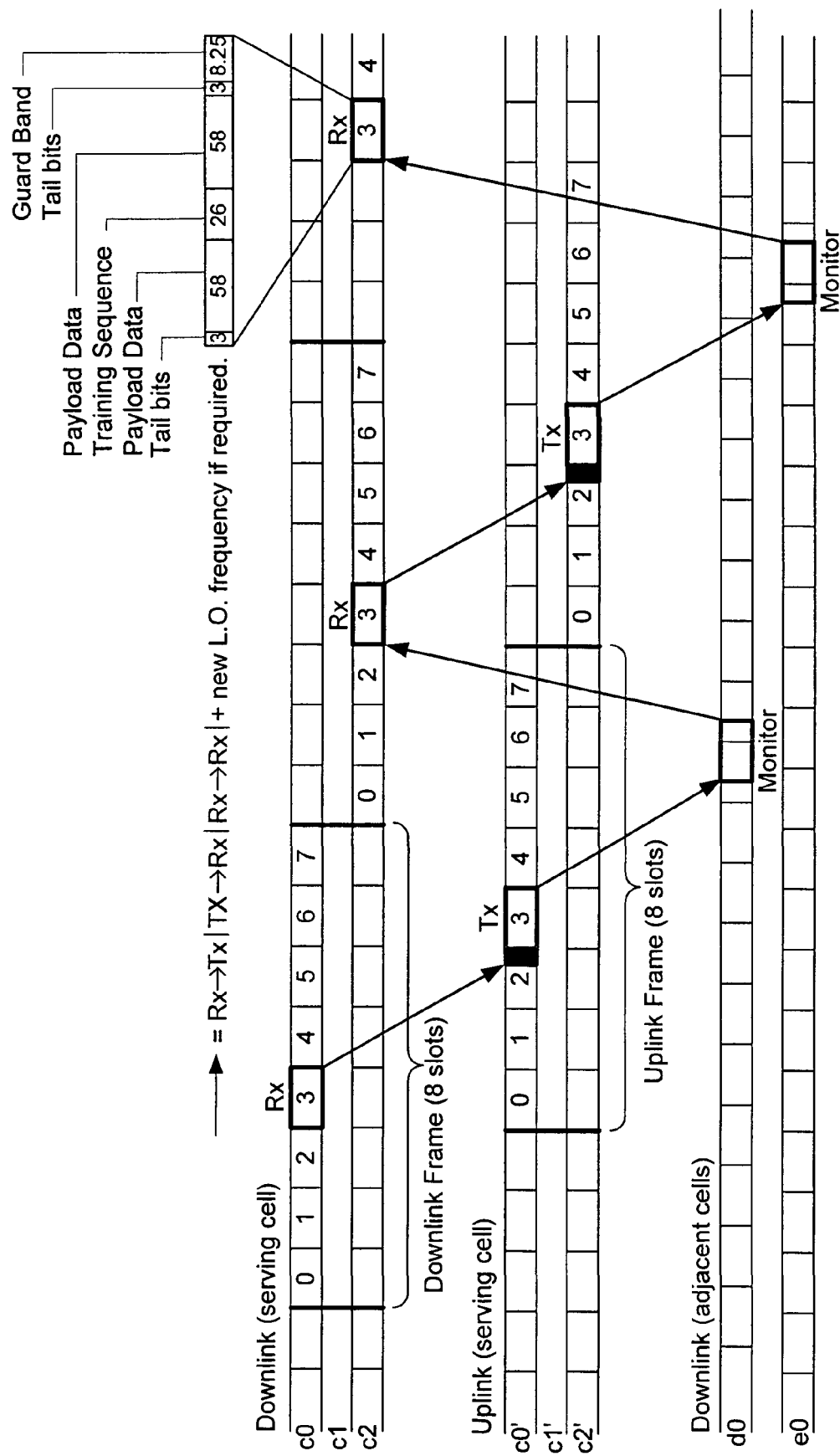

In order to avoid simultaneous transmission to WLAN and GSM/GPRS/WCDMA in a terminal with two dedicated transmitters, the transmitters can be switched on/off. A GSM/GPRS signal is quite bursty and uses any time 1 slot out of 1 frame comprising 8 slots. The frames are repeated consecutively in time. For this reason GSM is called a TDMA system. The GPRS BaseBand is able through the GPIO communication channel to provide the WLAN with this synchronisation signal resulting in a repetitive time window opening, as shown in FIG. 1. In FIG. 2, the mobile station usage of physical channel timeslots is shown for a full-rate hopping traffic channel assigned timeslot 3.

One slot is 577 μsec and 1 frame is 4.6 millisec. As you have to count for the charging time due to the depletion of the feeding capacitors on the board it results in having more than 3-millisec to transfer WLAN data to the AP's. One (or even 2 or more) TCP/IP frame(s) on WLAN will perfectly fit in this 2-millisecond time window. As long as the GSM/GPRS PA is switched on the WLAN data stream is buffered, which is why the WLAN PA is turned off. The WLAN part can transmit again as soon as the GSM PA is turned off but not before the battery-capacitors are topped up.

For WCDMA one can find in connected mode in all substates but CELL_DCH only the RACH Tx bursts. By applying the RACH bursts the terminal is updating the RRC network element with the cell measurements and is performing LU/RAU updates as required. The WCDMA baseband is able through the GPIO communication channel to provide the WLAN with this synchronisation signal.

In the first instance the mechanism is the same as for GSM/GPRS. As long as the WCDMA PA is switched on the WLAN data stream is buffered, which is why the WLAN PA is turned off. However when the terminal has been long enough in CELL_DCH state it is yet allowed to turn on the WLAN transmitter and in addition the WCDMA PA will be switched off. However it happens that when both WLAN and WCDMA PA are emitting at the allowed full power, the maximum current defined by the PCMCIA limit is not yet reached and therefore the WLAN shall proceed with transmitting.

Figure 3:
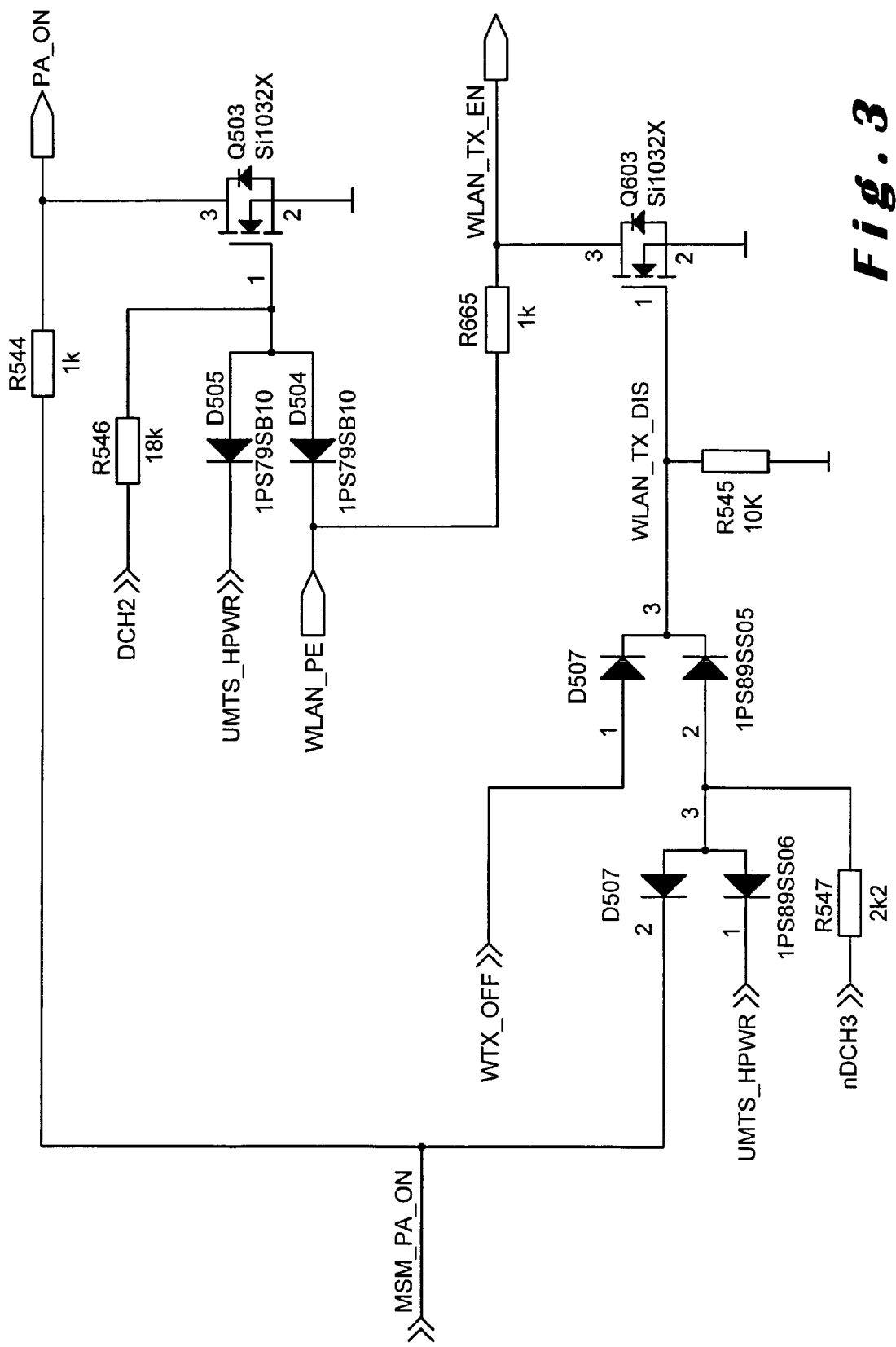
FIG. 3 shows a scheme of a terminal implementing the method of the invention.

In FIG. 3, a scheme of a terminal according to the invention is shown. Table 1 below defines in a one-to-one relationship of signals what is carried out by the circuitry of the terminal of FIG. 3. All mentioned signals are active high, except for nDCH3.

TABLE 1

| DCH2 | UMTS_HPWR | WLAN_PE | MSM_PA_ON | PA_ON |
|---|---|---|---|---|
| X | X | X | L | L - OFF |
| H | H | H | X | L - OFF |
| L | X | X | H | H - ON |
| X | L | X | H | H - ON |
| X | X | L | H | H - ON |

Table 1 shows that if under normal conditions of WLAN being none existent and if the command is not there to switch on the WCDMA PA the PA remains off. When the UMTS terminal is in a high power mode and the terminal has been long enough in CELL_DCH to establish a call or to register and authenticate with the network (DCH2 becomes active high), the WCDMA PA shall be turned off if the WLAN part wants something to transmit. It is the only instance at which the WLAN part is cutting off the Tx of the WCDMA part. These are also the only circumstances that the WLAN part is taking control over the UMTS part. For the very reason the power control closed loop is cut simultaneously appropriate actions need to be taken for preventing the instability of the Tx WCDMA power open loop. (♦♦)

Under all other conditions (either DCH2, UMTS_HPWR or WLAN_PE is low) the WCDMA PA shall be turned on if there is a need to. In logic, the circumstances are needed which are the negation of the conditions defined in the first two rows.

TABLE 2

| WTX_OFF | nDCH3 | UMTS_HPWR | MSM_PA_ON | WLAN_PE | WLAN_TX_EN |
|---|---|---|---|---|---|
| X | X | X | X | L | L - OFF |
| H | X | X | X | X | L - OFF |
| X | H | H | H | X | L - OFF |
| L | L | X | X | H | H - ON |
| L | X | L | X | H | H - ON |
| L | X | X | L | H | H - ON |

Table 2 shows that if under normal conditions of UMTS being none existent and if the command is not there to switch on the WLAN transmitter data are buffered at the WLAN MAC layer and consequently the PA remains off. When the WCDMA terminal is in a high power mode and the terminal has not been long enough in CELL_DCH to establish a call, the WLAN transmitter shall be turned off if the UMTS part wants something to transmit.

The same is true for the GPRS terminal: when the GPRS terminal is transmitting, the WLAN PA shall be turned off if the GPRS part wants something to transmit.

Under all other conditions (no GPRS and either DCH2, UMTS_HPWR or WLAN_PE is low) the PA shall be turned on if it's needed to. In logic, the circumstances are needed which are the negation of the conditions defined in the first three rows.

DCH2: defines whether the UMTS terminal has been long enough in CELL_DCH state is for the WLAN to turn off the WCDMA PA. If the UMTS terminal is in another state then CELL_DCH DCH2 shall be forced low. It is active high. (♦♦)

nDCH3: negation of the condition DCH2.

UMTS_HPWR: Denotes the condition of the UMTS terminal transmitting with a power greater than a pre-defined maximum. (♦)

WLAN_PE: transmitter enable signal for WLAN; in MAC/PHY layer implementation one can find there are two alternatives to stop the transmitter from emitting power.

MSM_PA_ON: PA enable signal of UMTS, supplied by the baseband-processing unit.

WTX_OFF: follows the Tx PA enable signal for GSM/GPRS, but shall remain switched off as long as the battery-capacitors aren't topped up.

(♦) The power consumption of the terminal is confined by the PCMCIA standard. The maximum power level for the UMTS terminal (UMTS_HPWR) is defined by a current measurement given the constraints mentioned above. In the test set-up the WLAN part is set continually at the allowed full power. Gradually the WCDMA power is stepped up until the maximum current supported by the host is reached. This value of UMTS_HPWR will be stored in read-only memory. It happens that when both WLAN and WCDMA PA are sending out at their allowed full power, the maximum current defined by the PCMCIA limit is not yet reached and therefore the signal UMTS_HPWR shall remain inactive low. Therefore the WLAN shall keep transmitting.

(**) As the inner closed loop power control is opened up in the single action of the WLAN taking control over the WCDMA and the adjustments of power control are very fast (1500 TPC/sec), the power steps to be applied are stopped prior to the actual moment of cutting off the WCDMA Tx PA. As the WCMDA baseband processing unit has the inside information of the signals DCH2 and UMTS_PWR the unit needs only to inquire additionally upon the signal WLAN_PE. As soon as the WLAN part wants to transmit by setting WLAN_PE high, and the terminal has been long enough in CELL_DCH to establish a call, a small timer is invoked for the process of power steps adjustments to freeze. Once this timer elapses DCH2 becomes active high. When either DCH2 or UMTS_PWR becomes low inactive, the process resumes from where it left off.

Below it is discussed how the method of the invention is implemented in the MAC/PHY layer.

For the WLAN transmitter, basically the WLAN data stream is buffered at the MAC Tx buffer and synchronised with the Tx GPRS/UMTS. As no data is presented to the lower physical layer, the WLAN PA does not emit power.

The terminal knows the start time for the assigned GPRS/WCDMA slots and, when in the transmitting mode, the MAC of the terminal could anticipate if it has enough time to transmit a given MPDU. As active GPRS/WCDMA slots interrupt the WLAN transmissions the MPDU length could not be greater than a limit, which is a function of the transmission rate. The greatest WLAN continuous transmission time must fit the expected maximum number of GPRS/WCDMA slots in idle mode, denoted in y sec as follows (see the table of FIG. 4):

$$DIFS+RTS/\text{rate}+SIFS+CTS/\text{rate}+SIFS+MPDU/\text{rate}+SIFS+ACK/\text{rate} < y \text{ sec}$$

In order to exchange WLAN traffic the terminal should obey the rules for the basic access and back-off procedures. So after an active GPRS/WCDMA slot the terminal seizes the WLAN transmission medium for DIFS time interval as IDLE and, before initiating a transmission and to defer transmission for a random number of contention slots in case of a collision, it initiates the session by RTS-CTS message exchange. The session is initiated only from the moment on the next idle slots can accommodate the transmission of an MPDU and the receiving of its ACK, besides the RTS-CTS messages. Again the control gaining of the WLAN transmission medium will be useless if there is not enough time to transmit an MPDU and to receive its associated ACK.

If a WLAN traffic exchange is interrupted by an active GPRS/WCDMA slot, its resuming is made through the same procedure as its initiation because the medium control could have been taken by another terminal during the idle GPRS/WCDMA slot.

Large MPDU blocks may approach the number of bits where the probability of either an overlap with an active GPRS/WCDMA slot or a collision occurring may=1, i.e. every block could fail including the re-transmission. To reduce the possibility of this happening large blocks have to be fragmented by the transmitter and reassembled by the receiver. Of course there is some overhead in doing this and so therefore the frame size must not be too small.

The 'Data Link Layer' MAC as well as the 'Physical Layer' PLCP procedure provide a transmission service to the next higher OSI layer. On the MAC side, the MAC Service Data Units (MSDU) are filled with data coming from the 'Data Link Layer' LLC.

Here a MAC Service Data Unit (MSDU) shall be cut into several MAC MPDU units in smaller size.

It might happen during WLAN receiving mode the terminal could not entirely receive an MPDU or it cannot acknowledge it until the next assigned GPRS/WCDMA slot. The acknowledgment must be sent in SIFS time (10 μsec worse case) after a reception of the MPDU packet. Therefore the timeout (after some SIFS) for receiving an ACK is smaller than a GPRS/WCDMA slot so that an MPDU correctly received but not acknowledged due to an active GPRS/WCDMA slot cannot be acknowledged anymore. Hence the MPDU in question is lost too.

In both of the cases the sending terminal will retransmit the respective MPDU and the traffic exchange could proceed. However it might happen that the maximum number of retransmissions is exceeded. If this number has been reached without receiving an ACK, the packet will be dropped and this may force the applications running on the station to time out after several milliseconds.

To reduce the possibility of this happening, large blocks must be fragmented by the sending terminal and reassembled by the receiving terminal. While there is some overhead in doing this—both the probability of an error occurring is reduced and, in the event of an error, the re-transmission time is also reduced.

It is not only important to consider throughput and MPDU delay performance, but 'staying connected' is as well of the essence. It is important in all cases that the WLAN STA remains attached to the network, ready for transmitting data.

This staying connected/attached must be considered in two gradations: (1) on LLC/MAC/PHY level and (2) and Internetworking Layer 3/4 TCP/IP level From the moment (1) does not perceive the STA anymore it will give the control for further analysis to (2) but it is at the expense of loosing frames, extra delay, so in other words quality loss.

So even in a GPRS/WCDMA/GPRS idle state where you have paging, location and routing area updates, or in the WLAN case when an AP has packets queued for a terminal in doze (a traffic indication map (TIM) is broadcast as part of the timing beacon; the terminal in the doze mode powers up the receiver listening for beacons; if identified by the TIM, they return to the awake mode and transmit a PS-Poll message to alert the AP that they are ready to receive data), the very unlucky situation can occur that these actions from either GPRS or WLAN coincide, and that level (1) is giving the control to (2).

Whenever a collision of both transmitters is to be inevitable, the control level rises immediately to the IP session by squeezing the WLAN transmitter and putting the WLAN PA on off. The TCP protocol will ask for a retransmit of data blocks, but the end-user will not be aware of a retransmit being requested. As a matter of fact the TCP/IP protocol is quite resilient to such a hitch. Further this shunting off of the PA WLAN transmitter can be viewed as a second alternative to the aforementioned buffering of data at the WLAN MAC 'Data Link Layer', although the latter is in fact the better alternative.

The above shows that the best way to handle the simultaneous connection to both networks is not in the driver but in the lower levels. A first reason is the difficulties to synchronise the two devices on driver level. A second reason is that it is impossible to keep track in real time at driver level, since it is not possible to control WLAN traffic and timings effectively at that level. It is not possible to have exact timing in the driver. All timings are done in the MAC level and the driver, risking stability, cannot interrupt some of those tasks.

Finally, an extra specification is presented for the complete all-inclusive RF Radio.

In order to determine sensitivity and out-of-band blocking, severe tests are done on sensitivity degradation from one Tx (either DCS/PCS/FDD or WLAN) to the other Rx (reversely either WLAN or DCS/PCS/FDD). For the direction 3GPP Tx to WLAN Rx the whole receiver input stage in DCS/PCS/FDD is already quite good and give an attenuation of 40 dB in the WLAN band.

However the reversed direction is of a manifestly different order. Here the front-end suppression of unwanted signals in a usual WLAN design as if there were no other access technology than WLAN on the PC Card, is insufficient. A usual WLAN design is a reference circuitry design delivered by the manufacturer in order to promote their WLAN chipsets.

Therefore a special front-end filter type was selected in front of the on average WLAN Rx, which offers extra attenuation in the DCS/PCS/FDD band.

The IIP3 input power is defined as if the input signal power level were as high as IIP3 ($3^{rd}$ order input intercept power) the $3^{rd}$ order distortion product at the output of the WLAN Rx will be as strong as the fundamental signal itself. Therefore the $3^{rd}$ order intercept point is a useful figure of merit for the degree of linearity of the Rx.

As an engineering rule of thumb one might argue, that a 13 dB weaker input signal will not cause deterioration of the performance of the WLAN Rx and therefore pass all approvals (Sensitivity, out-of-band blocking, etc.) for WLAN in question. Hence according to the rule of thumb more than −21 dBm input power may be applied as the WLAN Rx IIP3 point of the reference design chosen for the UMTS/GPRS/WLAN PC Card is −8 dBm. Subsequently after taking in consideration the antenna isolation between the different access technologies, the attenuation of the extra front-end filter should be more than 34 dB in GSM, 36 in DCS and PCS and 33 dB in the FDD band, as shown in table 3.

TABLE 3

| UMTS/GPRS/WLAN PC Card | Frequency | PWR dBm | Ant ISOL | Attn front end filter |
|---|---|---|---|---|
| WLAN IL | | 4 | | out of band |
| WLAN IIP3 | 2400-2500 MHz | −8 | | In-band signal at input stage of present front-end shouldn't be more than −8-13 dBm. |
| GSM PWR | 880-915 MHz | 33 | 20 | 34 =33 − 20 − 34 |
| DCS PWR | 1710-1785 MHz | 30 | 15 | 36 −21 |
| PCS PWR | 1850-1910 MHz | 30 | 15 | 36 −21 |
| FDD PWR | 1920-1980 MHz | 24 | 12 | 33 −21 |

As FIG. 5 shows, all 3 selected front-end filters of 3 different vendors shall perform. The actual selection of the filter depends on price, size and availability.

So doing an out-of-band-blocking conductivity test on WLAN by injecting a PCS 2 Watt signal (6 dB attenuated) the sensitivity is reduced from −82 dB to the requested −76 dB. Reversely the blocking tests on DCS/PCS/FDD with a presumptive TX level of 15 dBm at the WLAN pilot frequency are passing the prerequisite.

Another example of an implementation (table 4) shows that the requirements of a front-end filter can be more severe. The reason one may find here is the lower IIP3 point and the worse antenna isolation between the access technologies.

TABLE 4

| GPRS/WLAN PC Card | Frequency | PWR dBm | Ant ISOL | Attn front end filter |
|---|---|---|---|---|
| WLAN IL | | 4 | | |
| WLAN IIP3 | 2400-2500 MHZ | −20 | | |
| GSM PWR | 880-915 MHz | 33 | 18 | 48 |
| DCS PWR | 1710-1785 MHz | 30 | 8 | 55 |
| PCS PWR | 1850-1910 MHz | 30 | 7 | 56 |
| FDD PWR | 1920-1980 MHz | 24 | 6 | 51 |

As regards simultaneous transmitting of WCDMA and WLAN there are no problems to expect besides of course the aforementioned power consumption. It shall never lead to marginal effects as mixed RF signals, distortion or harmonics.

However as the GSM/GPRS PA at DCS/PCS is working in a very high saturation spurious cross-products shall occur that would not pass an R&TTE approval. The Tx PCS PA is brought highly in saturation and as it were both transmitters are directly connected, the WLAN Tx is injected in the saturated PCS band. Reversely it is less of a problem as the TX WLAN PA is kept in a linear mode to get the right TX template with enough suppression at the harmonics. So shortly the source of worry is to prohibit that both transmitters of WLAN and GSM/GPRS are working simultaneously.

GLOSSARY

Peak Current: the highest averaged current value over any 10-millisecond period.
Average Current: the highest averaged current value over any 1-second period.
DCS: GSM/GPRS 1800 MHz
PCS: GSM/GPRS 1900 MHz
FDD: UMTS/WCDMA FDD 2100 MHz, so FDD is here referring to the frequency band
LLC: Logic Link Control IEEE 802.2
MAC: Media Access Control—Power, Security, etc. management of WLAN
WLAN: WLAN and 802.11g in the 2.4 GHz band
R&TTE: Radio and Telecommunications Terminal Equipment
GPIO: General Purpose Input and/or Output, mostly provided by pins on a microprocessor.
GPRS: GSM, GPRS and EGPRS
MPDU: MAC Protocol Data Unit; A complete MAC frame with header and Frame Check Sequence (FCS) is known as MAC Protocol Data Unit (MPDU) on the MAC side.
PLCP: Physical Layer Convergence Procedure
PS: Packet Switched Network
MSDU: MAC Service Data Units
SIFS: Short inter-frame space; Used for an ACK, CTS, the second or subsequent MPDU of a fragment burst, and by a Terminal responding to any polling by the coordinator. The shortest IFS, used for all immediate response actions.
DIFS: DCF inter-frame space; It is for a terminal operating under the DCF to transmit data frames and management frames. The longest IFS, used as a minimum delay for asynchronous frames contending for access.
DCF: distributed coordination function
PA: Power Amplifier: Last stage of the RF transmitter just before the antenna circuitry.
DPCH: dedicated physical channel in UMTS/WCDMA

The invention claimed is:

1. Method for managing simultaneous connections of a mobile telecommunications device to at least a wireless local area network and a mobile telephone network via a single terminal of the mobile telecommunications device, the method comprising the steps of:
   a) establishing a first wireless connection of the terminal with the wireless local area network,
   b) establishing a second wireless connection of the terminal with the mobile telephone network,
   c) responding to each network at predetermined times, such that the first and second wireless connections are maintained active,
   d) preventing simultaneous transmittals of data from the terminal to both networks over the first and second wireless connections;
wherein said steps of responding to each network and preventing simultaneous transmittals are implemented by means of operations performed in the physical and data link layer of the terminal,
wherein said operations performed in the physical and data link layer comprise determining a length of each data packet to be transmitted to the wireless local area network such that the transmission of said data packet fits in between timeslots allocated for transmissions to said mobile telephone network, said determination of said length taking into account the time for gaining access to the wireless local area network, the time for receiving an acknowledgement from the wireless local area network and a charging time of feeding capacitors of the terminal due to a depletion thereof after a mobile telephone transmission.

2. Method according to claim 1, characterised in that the method further comprises the steps of defining a hierarchy between different types of data to be transmitted over the first and second wireless connections and that step d) comprises the delaying of the transmittal of one type of data in favour of the transmittal of another type of data, based on the hierarchy.

3. Method according to claim 2, characterised in that voice data is placed higher and that text data is placed lower in said hierarchy.

4. Method according to claim 1, characterised in that the first and second connections are placed in a switchable master-slave configuration.

5. Method according to claim 4, characterised in that the first connection has a selectable protocol data frame length and a selectable communication rate and that when the second connection is master said protocol data frame length and communication rate are selected such that data throughput via the first connection is maximised.

6. Method according to claim 1, characterised in that the method further comprises the step of handing over a data communication from the first connection to the second connection or vice versa.

7. Method according to claim 6, characterised in that connection parameters of the first and second connections are monitored on the terminal and that the data communication is handed over when the connection parameters no longer meet predetermined values.

8. Method according to claim 1, characterised in that upon receipt of data from the mobile phone network via the second connection, a buffer request is transmitted to an access point of the wireless local area network via the first connection, the buffer request being a request to buffer data to be transmitted to the terminal on the access point.

9. Method according to claim 1, characterised in that said operations performed in the physical and data link layer comprise shutting down a power amplifier of a wireless local area network transmitter of said terminal for said prevention of simultaneous transmittals.

10. Method according to claim 1, characterised in that said operations performed in the physical and data link layer comprise buffering data to be transmitted to the wireless local area network in a media access control transmitter buffer for said prevention of simultaneous transmittals.

11. Mobile telecommunications device comprising:
   a single terminal equipped for supporting a first connection to a mobile telephone network and a second connection to a wireless local area network, the terminal comprising a processing means for simultaneously managing the first and second connections,
   said processing means being adapted for performing operations in the physical and data link layer of the terminal to respond to each network at predetermined times, such that the first and second wireless connections are maintained active, and
   preventing simultaneous transmittals of data from the terminal to both networks over the first and second wireless connections, wherein said processing means is adapted for determining a length of each data packet to be transmitted to the wireless local area network such that the transmission of said data packet fits in between timeslots allocated for transmissions to said mobile telephone network, taking into account the time for gaining access to the wireless local area network, the time for receiving an acknowledgement from the wireless local area network and a charging time of feeding capacitors of the terminal due to a depletion thereof after a mobile telephone transmission.

12. Mobile telecommunications device according to claim 11, characterised in that the terminal comprises separate receivers for each of the first and second connections.

13. Mobile telecommunications device according to claim 11, characterised in that the terminal comprises a single receiver for both the first and second connections.

14. Mobile telecommunications device according to claim 11, characterised in that the device comprises a single transmitter for both the first and second connections.

15. Mobile telecommunications device according to claim 11, characterised in that the device is a Personal Computer Memory Card International Association card.

16. Mobile telecommunications device according to claim 11, characterised in that the terminal is provided with a front-end filter for attenuating frequencies in the frequency band of the mobile telephone network during transmission towards the wireless local area network.

17. Mobile telecommunications device according to claim 11, characterised in that said processing means is adapted for shutting down a power amplifier of a wireless local area network transmitter of said terminal for said prevention of simultaneous transmittals.

18. Mobile telecommunications device according to claim 11, characterised in that the terminal comprises a media access control transmitter buffer for buffering data to be transmitted to the wireless local area network, said processing means being adapted to control said buffering of data in the media access control transmitter buffer for said prevention of simultaneous transmittals.

* * * * *

UNITED STATES PATENT AND TRADEMARK OFFICE
CERTIFICATE OF CORRECTION

| | | |
|---|---|---|
| PATENT NO. | : 8,098,577 B2 | Page 1 of 1 |
| APPLICATION NO. | : 11/143937 | |
| DATED | : January 17, 2012 | |
| INVENTOR(S) | : DeVos et al. | |

It is certified that error appears in the above-identified patent and that said Letters Patent is hereby corrected as shown below:

On the cover of the issued patent at section (75) Inventors, delete the third listed joint inventor's name "Lambert Achien" and insert --Lambert Achten--.

Signed and Sealed this
First Day of May, 2012

David J. Kappos
*Director of the United States Patent and Trademark Office*